(12) United States Patent
Ozaki et al.

(10) Patent No.: US 11,736,143 B2
(45) Date of Patent: Aug. 22, 2023

(54) PATTERN GENERATING DEVICE, PATTERN GENERATING METHOD, AND WIRELESS COMMUNICATION SYSTEM

(71) Applicant: SMC CORPORATION, Tokyo (JP)

(72) Inventors: Norimasa Ozaki, Moriya (JP); Toshiaki Kuwahara, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/804,405

(22) Filed: May 27, 2022

(65) Prior Publication Data
US 2022/0393718 A1    Dec. 8, 2022

(30) Foreign Application Priority Data

Jun. 2, 2021  (JP) ................................ 2021-092728

(51) Int. Cl.
*H04B 1/7143*   (2011.01)
*H04B 1/715*    (2011.01)

(52) U.S. Cl.
CPC ........... *H04B 1/7143* (2013.01); *H04B 1/715* (2013.01); *H04B 2001/7154* (2013.01)

(58) Field of Classification Search
CPC .... H04B 1/7143; H04B 1/715; H04B 1/7136; H04B 1/71384; H04B 2001/7154
See application file for complete search history.

(56) References Cited

U.S. PATENT DOCUMENTS

| | | | | |
|---|---|---|---|---|
| 5,515,369 A * | 5/1996 | Flammer, III | ......... | H04B 1/715 370/480 |
| 5,930,291 A * | 7/1999 | Hines | ..................... | H04B 1/713 708/250 |
| 6,108,366 A * | 8/2000 | Haartsen | ................ | H04B 1/713 708/250 |
| 6,188,715 B1 * | 2/2001 | Partyka | ................ | H04B 1/7156 375/138 |
| 7,230,971 B1 * | 6/2007 | Beard | ..................... | H04J 13/00 342/131 |
| 7,236,511 B2 * | 6/2007 | Batra | ..................... | H04B 1/715 375/348 |

(Continued)

FOREIGN PATENT DOCUMENTS

| | | |
|---|---|---|
| GB | 2 228 163 A | 8/1990 |
| JP | 2017-188868 A | 10/2017 |

OTHER PUBLICATIONS

Extended European Search Report dated Oct. 5, 2022 in European Patent Application No. 22176798 1, 8 pages.

*Primary Examiner* — James M Perez
(74) *Attorney, Agent, or Firm* — Oblon, McClelland, Maier & Neustadt, L.L.P.

(57) ABSTRACT

A pattern generating device includes a random number generating unit configured to generate a plurality of random numbers using a unique number assigned to a base wireless device as a seed, an associating unit configured to associate each of the different random numbers with a frequency of each channel, and a pattern generating unit configured to generate a change pattern by determining order of the plurality of random numbers based on numerical values represented by the respective random numbers, and by arranging the frequencies corresponding to the random numbers in same order as the order of the random numbers.

5 Claims, 6 Drawing Sheets

| | S21 | | S22 | | S23 | | S24 | |
|---|---|---|---|---|---|---|---|---|
| | FREQUENCY [MHz] | RANDOM NUMBER | FREQUENCY [MHz] | RANDOM NUMBER | FREQUENCY [MHz] | RANDOM NUMBER | FREQUENCY [MHz] | RANDOM NUMBER |
| A | 2403 | 1337906568 | 2422 | 340240664 | 2422 | 340240664 | 2466 | 10933374 |
| | ⋮ | ⋮ | ⋮ | ⋮ | 2431 | 277256148 | 2431 | 277256148 |
| | | | | | 2466 | 10933374 | 2422 | 340240664 |
| | 2429 | 634185450 | 2416 | 4175573501 | | | | |
| B | 2430 | 1143011938 | 2431 | 277256148 | | | | |
| | ⋮ | ⋮ | ⋮ | ⋮ | | | | |
| | 2455 | 3927482254 | 2433 | 4183055616 | | | | |
| C | 2456 | 1750344570 | 2466 | 10933374 | | | | |
| | ⋮ | ⋮ | ⋮ | ⋮ | | | | |
| | 2481 | 1231753419 | 2480 | 3808890956 | | | | |

88

(56) References Cited

U.S. PATENT DOCUMENTS

| | | | |
|---|---|---|---|
| 7,280,580 B1* | 10/2007 | Haartsen | H04B 1/7143 375/138 |
| 8,428,101 B1* | 4/2013 | Sarca | H04B 1/713 375/135 |
| 8,594,066 B2* | 11/2013 | Jeong | H04W 72/02 370/338 |
| 8,891,586 B1* | 11/2014 | Nichols | H04B 1/7143 375/132 |
| 10,349,400 B2* | 7/2019 | Tan | H04B 1/7143 |
| 10,742,259 B1* | 8/2020 | Vishwakarma | H04L 51/212 |
| 2002/0021745 A1* | 2/2002 | Negus | H04B 1/713 375/132 |
| 2002/0122462 A1* | 9/2002 | Batra | H04W 72/542 375/132 |
| 2002/0164990 A1* | 11/2002 | Balachandran | H04B 1/7143 455/450 |
| 2002/0191678 A1* | 12/2002 | Batra | H04B 1/715 375/132 |
| 2003/0133426 A1* | 7/2003 | Schein | H04W 74/006 370/347 |
| 2005/0078737 A1* | 4/2005 | Craig | H04B 1/715 375/132 |
| 2006/0133543 A1* | 6/2006 | Linsky | H04B 1/715 375/350 |
| 2007/0291822 A1* | 12/2007 | Staley | H04B 1/7143 375/E1.035 |
| 2009/0168846 A1* | 7/2009 | Filippo, III | H04B 1/7143 375/E1.034 |
| 2009/0303972 A1* | 12/2009 | Flammer, III | H04L 25/03866 370/338 |
| 2010/0260232 A1* | 10/2010 | Roh | H04B 1/7143 375/135 |
| 2013/0148626 A1* | 6/2013 | Van Stralen | H04W 16/14 375/133 |
| 2015/0071329 A1* | 3/2015 | Dewasurendra | H04B 1/7156 375/134 |
| 2017/0202028 A1* | 7/2017 | Gaal | H04W 74/0833 |
| 2017/0289959 A1* | 10/2017 | Aki | H04W 72/0453 |
| 2019/0097679 A1* | 3/2019 | Banik | H04B 1/7143 |
| 2019/0149190 A1* | 5/2019 | Liu | H04W 48/16 375/132 |
| 2019/0158139 A1* | 5/2019 | Talarico | H04W 16/14 |
| 2019/0387499 A1* | 12/2019 | Matthews | H04B 1/7136 |
| 2020/0044687 A1* | 2/2020 | Wechsler | H04L 5/0012 |
| 2020/0393536 A1* | 12/2020 | Stettiner | G01S 13/343 |
| 2021/0105041 A1* | 4/2021 | Obernosterer | H04W 76/11 |
| 2021/0156982 A1* | 5/2021 | Stettiner | G01S 13/931 |
| 2022/0377743 A1* | 11/2022 | Ozaki | H04Q 9/00 |
| 2022/0377757 A1* | 11/2022 | Ozaki | H04W 72/02 |
| 2022/0393718 A1* | 12/2022 | Ozaki | H04B 1/7143 |

* cited by examiner

| | S21 | |
|---|---|---|
| | FREQUENCY [MHz] | RANDOM NUMBER |
| A | 2403 | 1337906568 |
| | ...... | ...... |
| | 2429 | 634185450 |
| B | 2430 | 1143011938 |
| | ...... | ...... |
| | 2455 | 3927482254 |
| C | 2456 | 1750344570 |
| | ...... | ...... |
| | 2481 | 1231753419 |

| S22 | |
|---|---|
| FREQUENCY [MHz] | RANDOM NUMBER |
| 2422 | 340240664 |
| ...... | ...... |
| 2416 | 4175573501 |
| 2431 | 277256148 |
| ...... | ...... |
| 2433 | 4183055616 |
| 2466 | 10933374 |
| ...... | ...... |
| 2480 | 3808890956 |

| S23 | |
|---|---|
| FREQUENCY [MHz] | RANDOM NUMBER |
| 2422 | 340240664 |
| 2431 | 277256148 |
| 2466 | 10933374 |

| S24 | |
|---|---|
| FREQUENCY [MHz] | RANDOM NUMBER |
| 2466 | 10933374 |
| 2431 | 277256148 |
| 2422 | 340240664 |

| | S31 | |
|---|---|---|
| | FREQUENCY [MHz] | RANDOM NUMBER |
| A | 2403 | 1337906568 |
| | ...... | ...... |
| | 2442 | 3405600587 |
| B | 2443 | 1672775489 |
| | ...... | ...... |
| | 2481 | 1231753419 |

| S32 | |
|---|---|
| FREQUENCY [MHz] | RANDOM NUMBER |
| 2431 | 277256148 |
| 2422 | 340240664 |
| ...... | ...... |
| 2466 | 10933374 |
| 2475 | 54286283 |

| S33 | |
|---|---|
| FREQUENCY [MHz] | RANDOM NUMBER |
| 2431 | 277256148 |
| 2466 | 10933374 |
| 2422 | 340240664 |
| 2475 | 54286283 |
| ...... | ...... |

← 88

PATTERN GENERATING DEVICE, PATTERN GENERATING METHOD, AND WIRELESS COMMUNICATION SYSTEM

CROSS-REFERENCE TO RELATED APPLICATIONS

This application is based upon and claims the benefit of priority from Japanese Patent Application No. 2021-092728 filed on Jun. 2, 2021, the contents of which are incorporated herein by reference.

BACKGROUND OF THE INVENTION

Field of the Invention

The present invention relates to a pattern generating apparatus for generating a frequency change pattern, a pattern generating method for generating a change pattern of a frequency, and a wireless communication system for carrying out bidirectional communication by a frequency hopping method.

Description of the Related Art

JP 2017-188868 A discloses an industrial wireless communication system including a computer and a plurality of communication networks. The computer manages and controls a plurality of robots and the like. Each communication network includes a single base wireless device and a plurality of remote wireless devices. The base wireless device is connected to a computer. Meanwhile, each remote wireless device is connected to a sensor and an actuator. The sensor and the actuator are provided for a robot or the like. The base wireless device and the remote wireless devices carry out bidirectional communication by a frequency hopping method. JP 2017-188868 A discloses specific arithmetic expressions for generating a frequency change pattern.

SUMMARY OF THE INVENTION

When there are many communication networks that carry out communication by the frequency hopping method in the same area, it is preferable for each communication network to use a different hopping pattern in order to avoid collision of radio waves. However, the hopping patterns generated by the arithmetic expressions of JP 2017-188868 A include several to several tens of patterns. When the number of communication networks is small, there is a low possibility that radio waves collide with each other even in several to several tens of hopping patterns. However, when the number of communication networks increases, the possibility that radio waves collide with each other increases.

An object of the present invention is to solve the aforementioned problem.

According to a first aspect of the present invention, a pattern generating device generates a change pattern of a frequency used in a wireless communication system in which a base wireless device and at least one remote wireless device communicate with each other while changing the frequency. The pattern generating device includes a random number generating unit configured to generate a plurality of random numbers using a unique number assigned to the base wireless device as a seed, an associating unit configured to associate each of the different random numbers with the frequency of each channel, and a pattern generating unit configured to generate the change pattern by determining order of the plurality of random numbers based on numerical values represented by the respective random numbers, and by arranging the frequencies corresponding to the random numbers in same order as the order of the random numbers.

According to a second aspect of the present invention, a pattern generating method for generating a change pattern of a frequency used in a wireless communication system in which a base wireless device and at least one remote wireless device communicate with each other while changing the frequency, is provided. The pattern generating method includes a random number generating step of generating a plurality of random numbers using a unique number assigned to the base wireless device as a seed, an associating step of associating each of the different random numbers with the frequency of each channel, and a pattern generating step of generating the change pattern by determining order of the plurality of random numbers based on numerical values represented by the respective random numbers, and by arranging the frequencies corresponding to the random numbers in same order as the order of the random numbers.

According to a third aspect of the present invention, a wireless communication system in which a base wireless device and at least one remote wireless device communicate with each other while changing a frequency, is provided. The wireless communication system includes a random number generating unit configured to generate a plurality of random numbers using a unique number assigned to the base wireless device as a seed, an associating unit configured to associate each of the different random numbers with the frequency of each channel, and a pattern generating unit configured to generate a change pattern of the frequency by determining order of the plurality of random numbers based on numerical values represented by the respective random numbers, and by arranging the frequencies corresponding to the random numbers in same order as the order of the random numbers, a base frequency change unit configured to change the frequency of a radio wave used in communication from the base wireless device to the remote wireless device based on the change pattern, and a remote frequency change unit configured to change the frequency of a radio wave used in communication from the remote wireless device to the base wireless device based on the change pattern.

According to the present invention, collision of radio waves is less likely to occur between a plurality of communication networks that carry out communication by a frequency hopping method.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

[1 Wireless Communication System 10]

Figure 1:
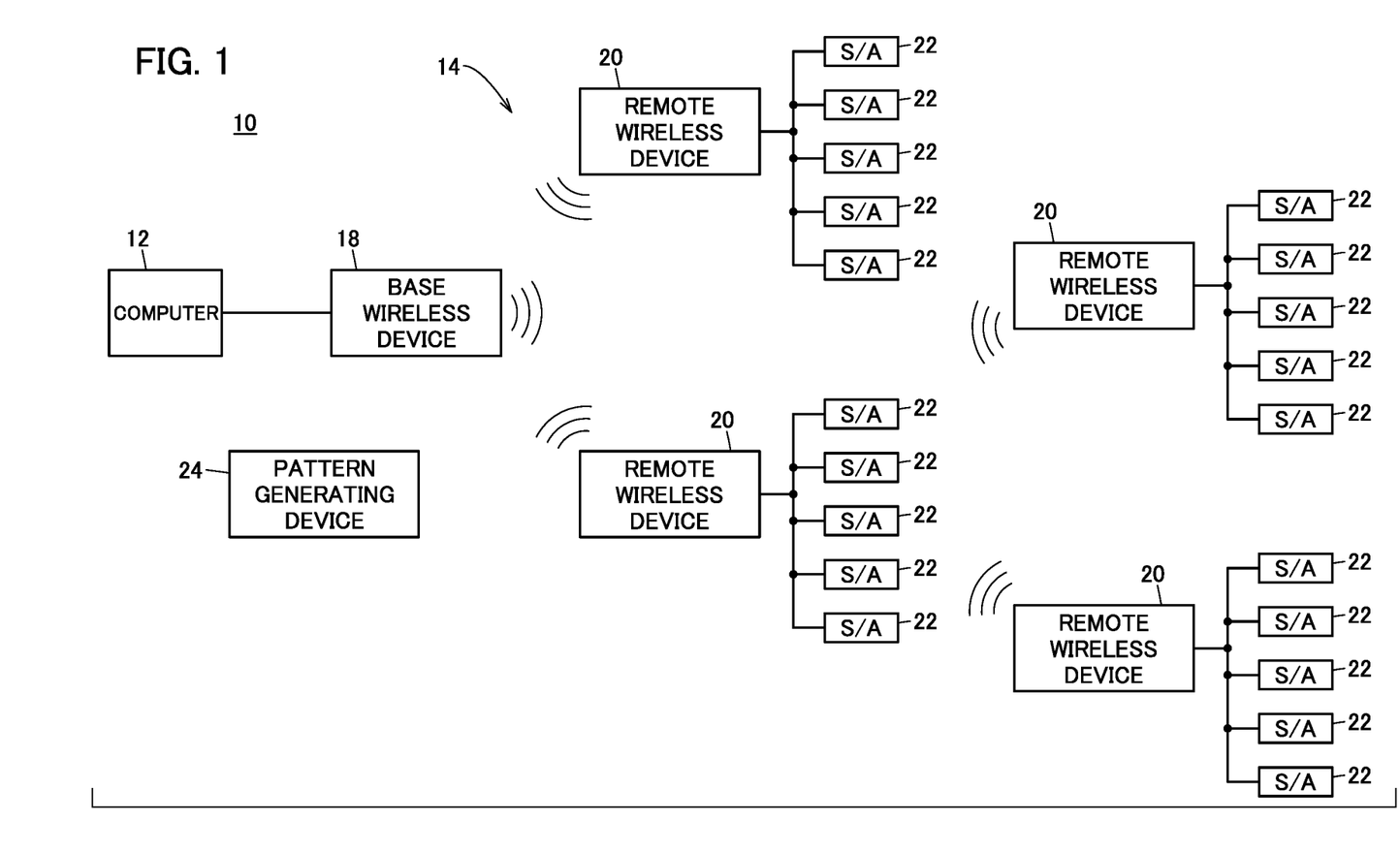
FIG. 1 is a diagram illustrating a configuration of a wireless communication system.
Figure 2:
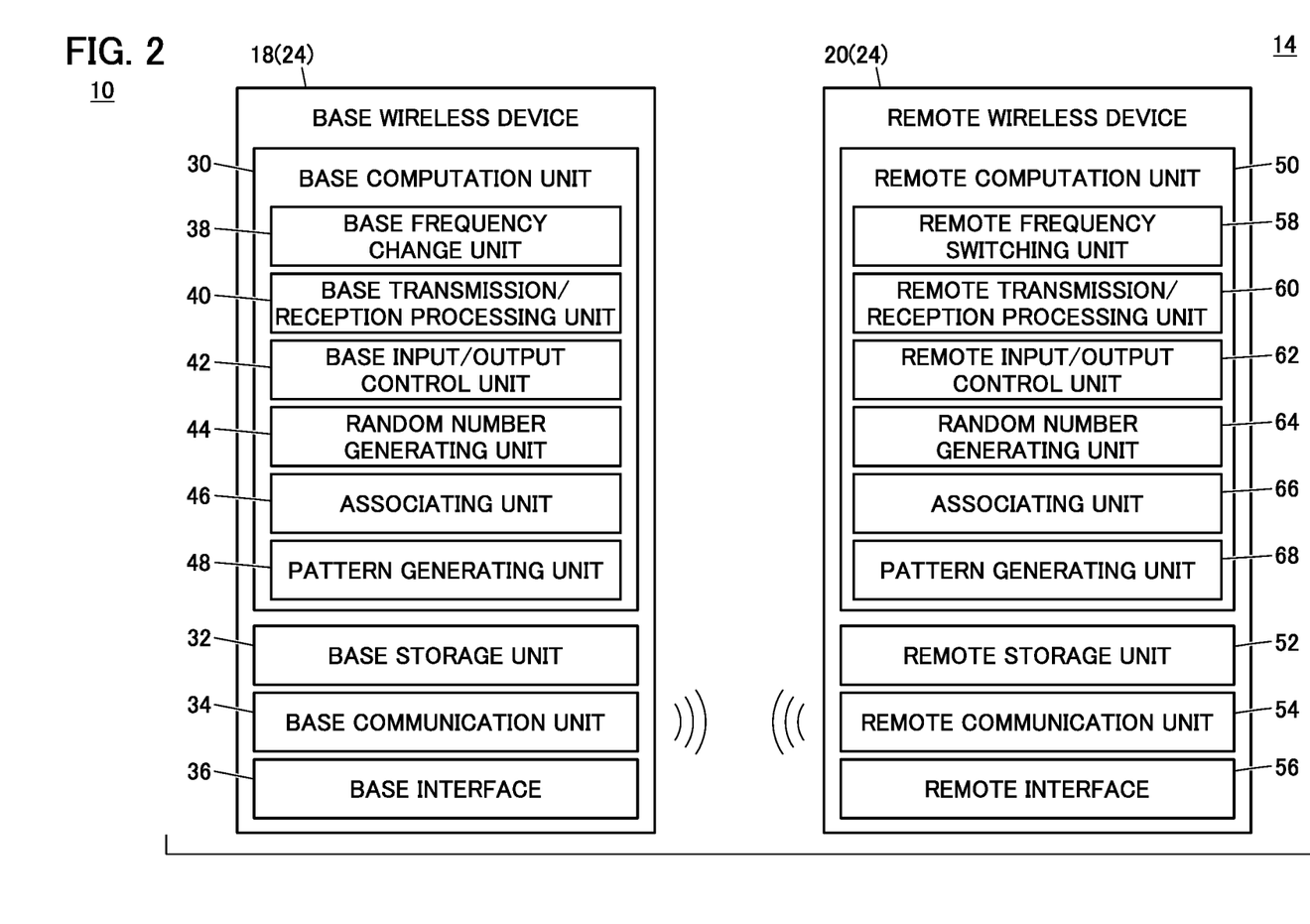
FIG. 2 is a functional block diagram of a communication network.

FIG. 1 is a diagram illustrating a configuration of a wireless communication system 10. FIG. 2 is a functional block diagram of a communication network 14. An industrial wireless communication system 10 includes a single computer 12, at least one communication network 14, and a pattern generating device 24. The one communication network 14 includes a single base wireless device 18 and a plurality of remote wireless devices 20. The base wireless device 18 and the remote wireless devices 20 carry out bidirectional communication while mutually changing frequencies. An industrial facility is provided with one or more robots (not shown) and the like.

The computer 12 monitors and controls one or more robots and the like. The computer 12 may include, for example, a programmable logic controller (PLC). The computer 12 includes an interface (not illustrated) for performing wired transmission and reception. The computer 12 transmits signals to the base wireless device 18 via the interface. The computer 12 also receives signals transmitted from the base wireless device 18 via the interface.

The one or more robots and the like include one or more actuators and one or more sensors. The actuator operates in accordance with instructions from the computer 12. The sensor detects an operation of the robot. The sensor and actuator are also collectively referred to herein as an S/A 22. Each of the actuators receives a control signal transmitted from the computer 12 via the base wireless device 18 and the remote wireless device 20. Each of the sensors transmits a sensor signal indicative of the detection result to the computer 12 via the base wireless device 18 and the remote wireless device 20.

The pattern generating device 24 generates a change pattern 88 (FIGS. 5 and 6) of a frequency to be changed in the base wireless device 18 and the remote wireless devices 20. The change pattern 88 includes a plurality of synchronous frequencies or a plurality of carrier frequencies (hopping frequencies). The synchronous frequency is a frequency of a radio wave used when the base wireless device 18 and the remote wireless device 20 perform a synchronization process. The carrier frequency is a frequency of a radio wave used when the base wireless device 18 and the remote wireless device 20 carry out bidirectional communication by the frequency hopping method. In the wireless communication system 10, both the base wireless device 18 and the remote wireless device 20 function as pattern generating devices 24. However, either the base wireless device 18 or the remote wireless device 20 may function as the pattern generating device 24. An independent device such as a personal computer may function as the pattern generating device 24. If the base wireless device 18 does not function as the pattern generating device 24, the base wireless device 18 obtains the change pattern 88 from the pattern generating device 24. Similarly, when the remote wireless device 20 does not function as the pattern generating device 24, the remote wireless device 20 acquires the change pattern 88 from the pattern generating device 24.

[2 Base Wireless Device 18 (Pattern Generating Device 24)]

As shown in FIG. 2, the base wireless device 18 includes a base computation unit 30, a base storage unit 32, a base communication unit 34, and a base interface 36. As described above, the base wireless device 18 functions as the pattern generating device 24.

The base computation unit 30 includes processing circuitry. The processing circuitry may be a processor such as a CPU. The processing circuitry may be an integrated circuit such as an ASIC, or an FPGA. For example, the processor has various functions by executing programs stored in the base storage unit 32. In the present embodiment, the base computation unit 30 functions as a base frequency change unit 38, a base transmission/reception processing unit 40, a base input/output control unit 42, a random number generating unit 44, an associating unit 46, and a pattern generating unit 48.

The base frequency change unit 38 switches the frequency of the channel used by the base communication unit 34 based on the change pattern 88 generated by the pattern generating unit 48.

The base transmission/reception processing unit 40 uses the transmission circuit of the base communication unit 34 to perform a process of transmitting signals to the remote wireless devices 20. In addition, the base transmission/reception processing unit 40 uses the reception circuit of the base communication unit 34 to perform a process of receiving signals transmitted by the remote wireless devices 20.

The base input/output control unit 42 uses the base interface 36 to perform a process of transmitting a signal to another device. The base input/output control unit 42 uses the base interface 36 to perform a process of receiving a signal from another device. The transmission/reception process performed by the base input/output control unit 42 is different from the transmission/reception process performed by the base transmission/reception processing unit 40. The base input/output control unit 42 may use the base interface 36 to perform a process of writing data into a storage medium that is attachable to and detachable from the base wireless device 18. The base input/output control unit 42 may use the base interface 36 to perform a process of reading data from a storage medium that is attachable to and detachable from the base wireless device 18.

Figure 4:
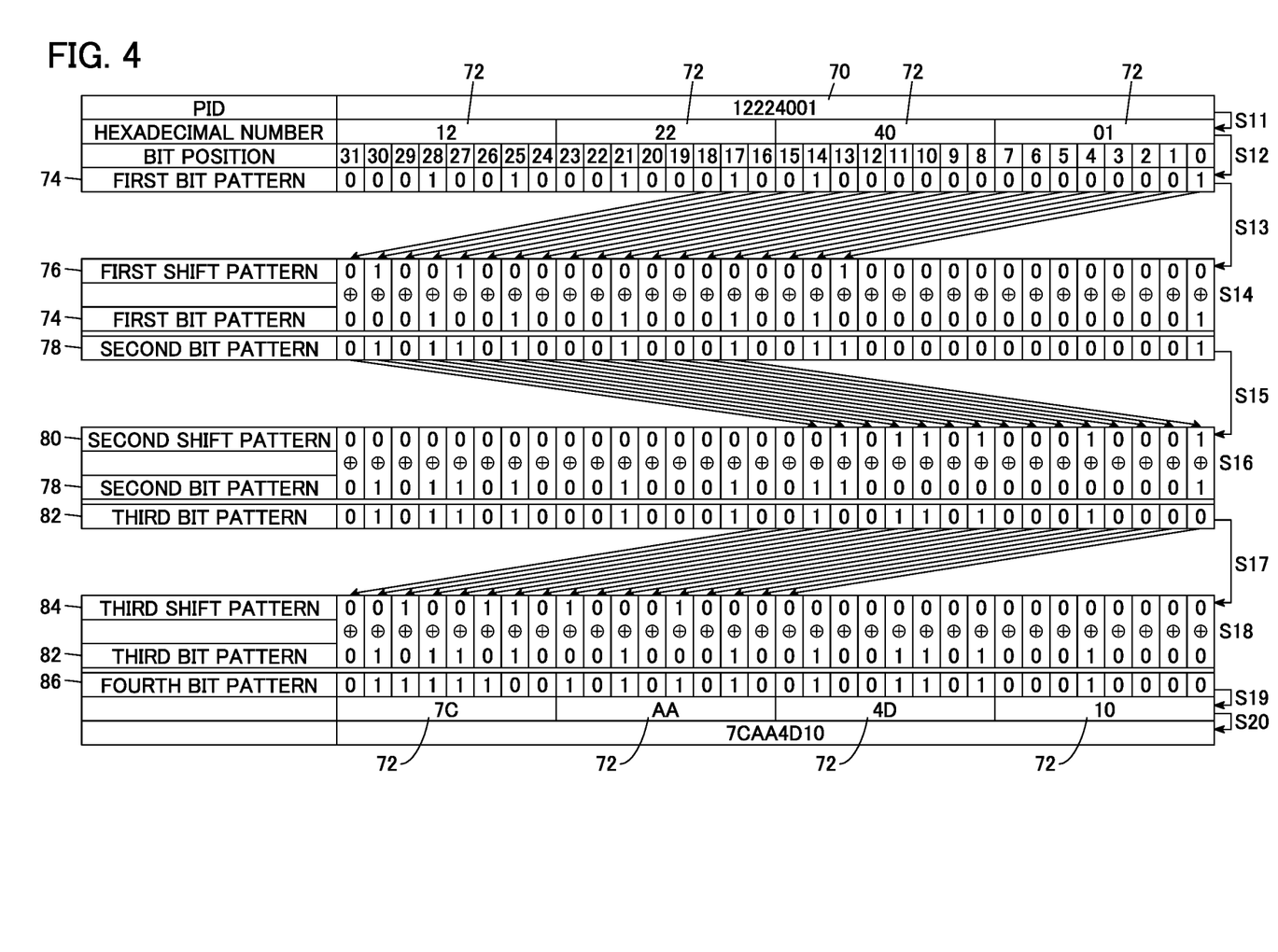
FIG. 4 is a diagram illustrating an example of a process of random number generation.

The random number generating unit 44 acquires a unique number (PID) assigned to the base wireless device 18 from the base storage unit 32 or an input device (not shown). The random number generating unit 44 generates a plurality of random numbers using the PID as a seed 70 (FIG. 4).

The associating unit 46 associates different random numbers with frequencies of available channels. The associating unit 46 acquires information on available channels from the base storage unit 32 or an external device (not illustrated).

The pattern generating unit 48 determines the order of the plurality of random numbers based on the numerical values indicated by the random numbers. The pattern generating unit 48 generates the change pattern 88 by arranging the frequencies corresponding to the random numbers in the same order as the random numbers.

The base storage unit 32 includes a volatile memory and a nonvolatile memory. Examples of the volatile memory include a RAM. Examples of the nonvolatile memory include a ROM and a flash memory. The volatile memory stores, for example, data acquired externally and data calculated by the base computation unit 30. The nonvolatile memory stores, for example, a predetermined program and a predetermined numerical value. The base storage unit 32 stores the change pattern 88 generated by the pattern generating unit 48. At least a part of the base storage unit 32 may be included in a processor, an integrated circuit, or the like as described above.

The base communication unit 34 includes a communication circuit. The communication circuit includes a transmission circuit and a reception circuit. The base communication unit 34 transmits signals to the remote wireless devices 20. The base communication unit 34 receives signals transmitted by the remote wireless devices 20.

The base interface 36 includes an interface through which the base wireless device 18 inputs and outputs data to and from another device. For example, the base interface 36 may include a wired interface for the base wireless device 18 to carry out wired communication with another device. The base interface 36 may include a wireless interface for the base wireless device 18 to carry out short-range wireless communication with another device. The base interface 36 may include an interface for writing data into a storage medium that is attachable to and removable from the base wireless device 18. The base interface 36 may include an interface for reading data from a storage medium that is attachable to and detachable from the base wireless device 18.

[3 Remote Wireless Device 20 (Pattern Generating Device 24)]

As illustrated in FIG. 2, the remote wireless device 20 includes a remote computation unit 50, a remote storage unit 52, a remote communication unit 54, and a remote interface 56. As described above, the remote wireless device 20 functions as the pattern generating device 24.

The remote computation unit 50 includes processing circuitry. The processing circuitry may be a processor such as a CPU. The processing circuitry may include an integrated circuit such as an ASIC or an FPGA. For example, the processor has various functions by executing programs stored in the remote storage unit 52. In the present embodiment, the remote computation unit 50 functions as a remote frequency change unit 58, a remote transmission/reception processing unit 60, a remote input/output control unit 62, a random number generating unit 64, an associating unit 66, and a pattern generating unit 68.

The remote frequency change unit 58 switches the frequency of the channel used by the remote communication unit 54 based on the change pattern 88 generated by the pattern generating unit 68.

The remote transmission/reception processing unit 60 uses the transmission circuit of the remote communication unit 54 to perform a process of transmitting a signal to the base wireless device 18. In addition, the remote transmission/reception processing unit 60 uses the reception circuit of the remote communication unit 54 to perform a process of receiving a signal transmitted by the base wireless device 18.

The remote input/output control unit 62 uses the remote interface 56 to perform a process of transmitting a signal to another device. The remote input/output control unit 62 uses the remote interface 56 to perform a process of receiving a signal from another device. The transmission/reception process performed by the remote input/output control unit 62 is different from the transmission/reception process performed by the remote transmission/reception processing unit 60. The remote input/output control unit 62 may use the remote interface 56 to perform a process of writing data into a storage medium that is attachable to and detachable from the remote wireless device 20. The remote input/output control unit 62 may use the remote interface 56 to perform a process of reading data from a storage medium that is attachable to and detachable from the remote wireless device 20.

The random number generating unit 64 acquires a unique number (PID) assigned to the base wireless device 18 from the remote storage unit 52 or an input device (not shown). The random number generating unit 64 generates a plurality of random numbers using the PID as the seed 70. The random number generating unit 64 performs the same process as the process performed by the random number generating unit 44 of the base wireless device 18. Therefore, the random number generating unit 64 generates the same random number as the random number generated by the random number generating unit 44.

The associating unit 66 associates different random numbers with frequencies of available channels. The associating unit 66 acquires information on available channels from the remote storage unit 52 or an external device (not illustrated).

The pattern generating unit 68 determines the order of the plurality of random numbers based on the numerical values indicated by the random numbers. The pattern generating unit 68 generates the change pattern 88 by arranging the frequencies corresponding to the random numbers in the same order as the random numbers. The pattern generating unit 68 performs the same process as the process performed by the pattern generating unit 48 of the base wireless device 18. Therefore, the pattern generating unit 68 generates the same change pattern 88 as the change pattern 88 generated by the pattern generating unit 48.

The remote storage unit 52 includes a volatile memory and a nonvolatile memory. Examples of the volatile memory include a RAM. Examples of the nonvolatile memory include a ROM and a flash memory. The volatile memory stores, for example, data acquired externally and data calculated by the remote computation unit 50. The nonvolatile memory stores, for example, a predetermined program and a predetermined numerical value. The remote storage unit 52 stores the change pattern 88 generated by the pattern generating unit 68. At least a part of the remote storage unit 52 may be included in a processor, an integrated circuit, or the like as described above.

The remote communication unit 54 includes a communication circuit. The communication circuit includes a transmission circuit and a reception circuit. The remote communication unit 54 transmits a signal to the base wireless device 18. The remote communication unit 54 receives a signal transmitted by the base wireless device 18.

The remote interface 56 has an interface through which the remote wireless device 20 inputs and outputs data to and from another device. For example, the remote interface 56 may include a wired interface for the remote wireless device 20 to carry out wired communication with another device. The remote interface 56 may include a wireless interface for the remote wireless device 20 to carry out short-range wireless communication with another device. The remote interface 56 may include an interface for writing data into a storage medium that is attachable to and detachable from the remote wireless device 20. The remote interface 56 may include an interface for reading data from a storage medium that is attachable to and detachable from the remote wireless device 20.

[4 Change Pattern Generating Process]

Figure 3:
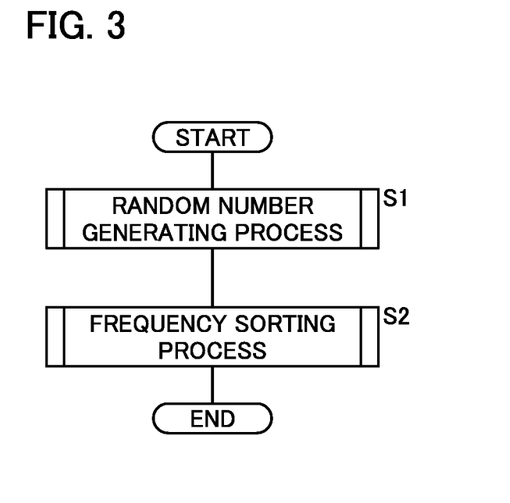
FIG. 3 is a flowchart illustrating a change pattern generating process.

The change pattern generating process performed by each of the pattern generating units 48 and 68 will be described with reference to FIGS. 3 to 6. FIG. 3 is a flowchart illustrating the change pattern generating process. The process illustrated in FIGS. 3 to 6 is performed by the base wireless device 18 functioning as the pattern generating device 24. The process illustrated in FIGS. 3 to 6 is also performed by the remote wireless device 20 functioning as the pattern generating device 24.

[4-1 First Embodiment]

The change pattern generating process of the first embodiment will be described with reference to FIGS. 3 to 5.

In step S1, the pattern generating device 24 performs a random number generating process. The random number generating process of the first embodiment will be described in a section [4-1-1] below. In step S2, the pattern generating device 24 performs a frequency sorting process. The frequency sorting process of the first embodiment will be described in a section [4-1-2] below. In step S2, the change pattern 88 is generated.

[4-1-1 Random Number Generating Process]

FIG. 4 is a diagram illustrating an example of a random number generating process. The random number generating process shown in FIG. 4 is performed by the random number generating unit 44. The random number generating process shown in FIG. 4 is also performed by the random number generating unit 64.

In step S1 of FIG. 3, the random number generating unit 44 generates pseudo random numbers by executing a predetermined algorithm. In this specification, the pseudo random number is simply referred to as a random number. For example, the random number generating unit 44 generates random numbers by Xorshift indicated by the following algorithm:

$X=SEED$
$X^1=X\hat{\ }(X<<13);$
$X^2=X^1\hat{\ }(X^1>>17);$
$X^3=X^2\hat{\ }(X^2<<15);$
Return X.

In the example illustrated in FIG. 4, the random number generating unit 44 uses a PID that is an eight-digit numerical value "12224001" as the seed 70. A process S11 to S20 indicated in FIG. 4 corresponds to a process of step S11 to step S20 described below, respectively.

In step S11, the random number generating unit 44 divides the PID into four groups 72. Each group 72 includes a two-digit numerical value.

In step S12, the random number generating unit 44 regards the two-digit numerical value included in each group 72 as a hexadecimal number. The random number generating unit 44 converts hexadecimal numbers into 8-bit binary numbers. The random number generating unit 44 generates a series of bit patterns by connecting the binary numbers of the four groups 72. This bit pattern is referred to as a first bit pattern 74. The first bit pattern 74 includes a 32-bit numerical value from the 0th bit to the 31st bit.

In step S13, the random number generating unit 44 logically shifts the first bit pattern 74 to the left by 13 bits. With this processing, the random number generating unit 44 discards the numerical values at the respective bit positions of the 19th to 31st bits of the first bit pattern 74. In addition, the random number generating unit 44 assigns zero (0) in each bit position of the 0th to 12th bits. The shifted bit pattern is referred to as a first shift pattern 76.

In step S14, the random number generating unit 44 adds the numerical values of the plurality of bit positions of the first bit pattern 74 and the numerical values of the plurality of bit positions of the first shift pattern 76. Specifically, the random number generating unit 44 adds the numerical values at the same bit positions, respectively. The random number generating unit 44 discards moved up or carried digits. The bit pattern after the addition is referred to as a second bit pattern 78.

In step S15, the random number generating unit 44 logically shifts the second bit pattern 78 to the right by 17 bits. In accordance with this processing, the random number generating unit 44 discards the numerical values at the respective bit positions of the 0th to 16th bits of the second bit pattern 78. In addition, the random number generating unit 44 assigns zero (0) in each bit position of the 15th to 31st bits. The shifted bit pattern is referred to as a second shift pattern 80.

In step S16, the random number generating unit 44 adds the numerical values of respective bit positions of the second bit pattern 78 and the numerical values of respective bit positions of the second shift pattern 80. Specifically, the random number generating unit 44 adds the numerical values at the same bit positions, respectively. The random number generating unit 44 discards moved up or carried digits. The bit pattern after the addition is referred to as a third bit pattern 82.

In step S17, the random number generating unit 44 logically shifts the third bit pattern 82 to the left by 15 bits. In accordance with this processing, the random number generating unit 44 discards the numerical values at the respective bit positions from 17th to 31st of the third bit pattern 82. In addition, the random number generating unit 44 assigns zero (0) in each bit position of the 0th to 14th bits. The shifted bit pattern is referred to as a third shift pattern 84.

In step S18, the random number generating unit 44 adds the numerical values of respective bit positions of the third bit pattern 82 and the numerical values of respective bit positions of the third shift pattern 84. Specifically, the random number generating unit 44 adds the numerical values at the same bit positions, respectively. The random number generating unit 44 discards moved up or carried digits. The bit pattern after the addition is referred to as a fourth bit pattern 86.

In step S19, the random number generating unit 44 divides the fourth bit pattern 86 having 32 bits into four groups 72. Each group 72 contains an 8-bit binary number. Further, the random number generating unit 44 converts the binary numbers of the four groups 72 into hexadecimal numbers.

In step S20, the random number generating unit 44 generates a random number by connecting the two-digit hexadecimal numbers of the four groups 72. In the example shown in FIG. 4, the random number is an 8-digit numerical value "7CAA4D10".

As described above, the random number generating unit 44 can generate one random number by performing the process from step S11 to step S20 once, using the PID as the seed 70. In addition, the random number generating unit 44 can generate a new random number by performing the process from step S11 to step S20 once, using the random number generated in step S20 as a new seed 70. As described above, the random number generating unit 44 can generate a plurality of random numbers by changing the number of times of performing the process from step S11 to step S20.

The above-described algorithm is an example. The random number generating process performed by the random number generating unit 44 is not limited to this example. The random number generating unit 44 may generate random numbers by other methods.

[4-1-2 Frequency Sorting Process]

The ISM band includes a band of 2403 to 2481 [MHz]. The band of 2403 to 2481 [MHz] includes 79 channels from a channel having a center frequency of 2403 [MHz] to a channel having a center frequency of 2481 [MHz]. An interval of 1 [MHz] is set between the center frequency of each channel and the center frequency of its adjacent channel. The pattern generating device 24 generates the change pattern 88 by performing the following frequency sorting process. The change pattern 88 has the respective center frequencies of the plurality of channels.

Figure 5:
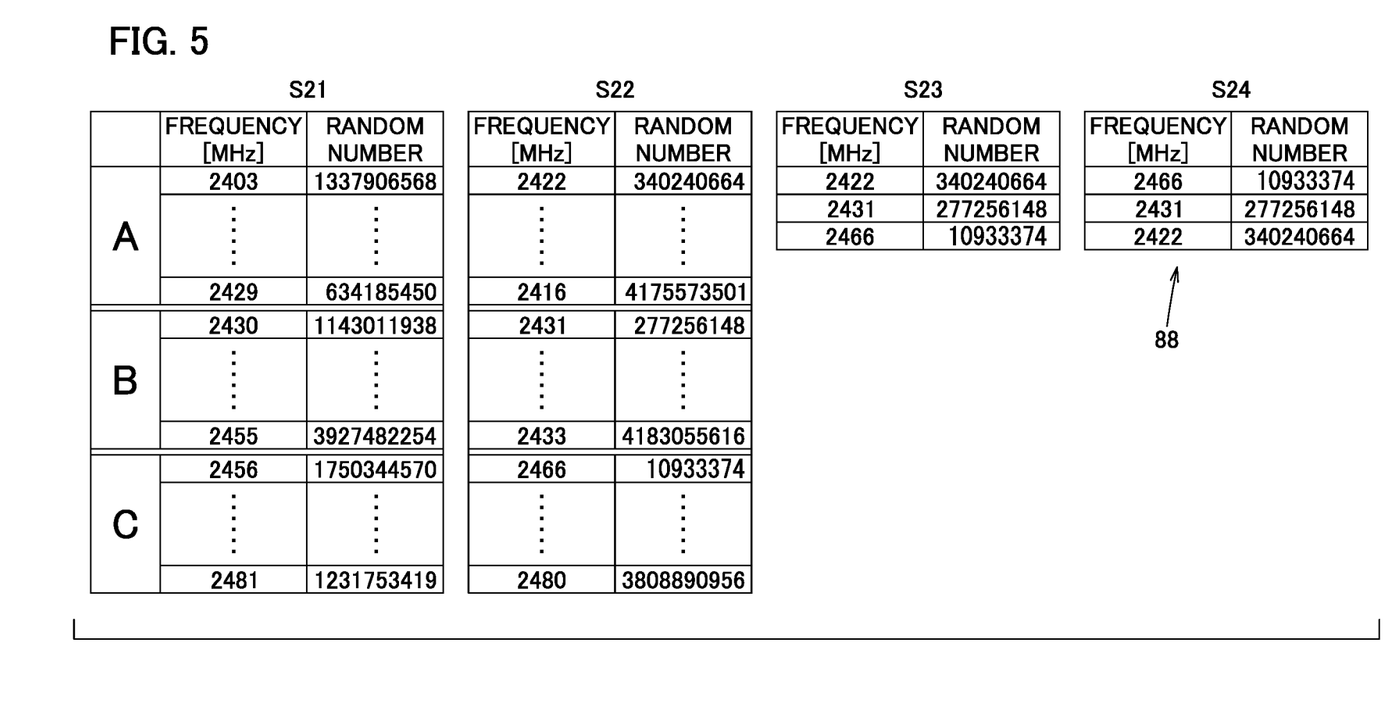
FIG. 5 is a diagram illustrating a frequency sorting process in a first embodiment.

FIG. 5 is a diagram illustrating a frequency sorting process in the first embodiment. The frequency sorting process illustrated in FIG. 5 is performed by the associating unit 46 and the pattern generating unit 48. The frequency sorting process illustrated in FIG. 5 is also performed by the associating unit 66 and the pattern generating unit 68.

In step S2 of FIG. 3, the associating unit 46 and the pattern generating unit 48 generate the change pattern 88 by executing the following algorithm. A process S21 to S24 shown in FIG. 5 correspond to a process of step S21 to step S24 described below.

In step S21, the associating unit 46 divides frequencies included in the band of 2403 to 2481 [MHz] into three groups. Group A includes frequencies of 2403 to 2429 [MHz]. Group B includes frequencies of 2430 to 2455 [MHz]. Group C includes frequencies of 2456 to 2481 [MHz]. Note that the associating unit 46 may divide the frequencies into a plurality of groups other than three. The associating unit 46 equalizes the number of frequencies included in each group. When the number of frequencies cannot be equal, the number of frequencies in the group A is made larger than in the group B.

Furthermore, the associating unit 46 associates each of different random numbers generated by the random number generating unit 44 with the frequency of each of the 79 channels. Decimal numbers corresponding to random numbers generated using "12224001" shown in FIG. 4 as the seed 70 are associated with the respective frequencies shown in FIG. 5. Specifically, a decimal number of a random number generated by performing the random number generating process 10+N times, is associated with the frequency of 2403+N (N is a natural number of 0 to 78) [MHz].

In step S22, the pattern generating unit 48 determines the order of the plurality of random numbers in each of the three groups, based on the numerical values represented by the respective random numbers. The pattern generating unit 48 regards a random number that is a string of n numbers as an n-digit numerical value. The pattern generating unit 48 determines the order of the respective random numbers when numerical values represented by the random numbers are arranged in ascending order in each of the three groups. Note that the pattern generating unit 48 may arrange the numerical values represented by the random numbers in descending order instead of ascending order.

In step S23, the pattern generating unit 48 selects a random number that is the smallest in each group. In the group A shown in FIG. 5, "340240664" is the smallest. The pattern generating unit 48 selects "2422" [MHz] corresponding to "340240664" from the group A. In the group B shown in FIG. 5, "277256148" is the smallest. The pattern generating unit 48 selects "2431" [MHz] corresponding to "277256148" from the group B. In the C group shown in FIG. 5, "10933374" is the smallest. The pattern generating unit 48 selects "2466" [MHz] corresponding to "10933374" from the group C. The pattern generating unit 48 may select a random number that is the largest in each group. In addition, the pattern generating unit 48 may select another nth random number, such as the second smallest or largest random number.

In step S24, the pattern generating unit 48 arranges the selected random numbers in ascending order. Further, the pattern generating unit 48 arranges the frequencies corresponding to the random numbers in the same order as the random numbers. The pattern generating unit 48 sets the frequency arrangement as the change pattern 88.

[4-2 Second Embodiment]

Figure 6:
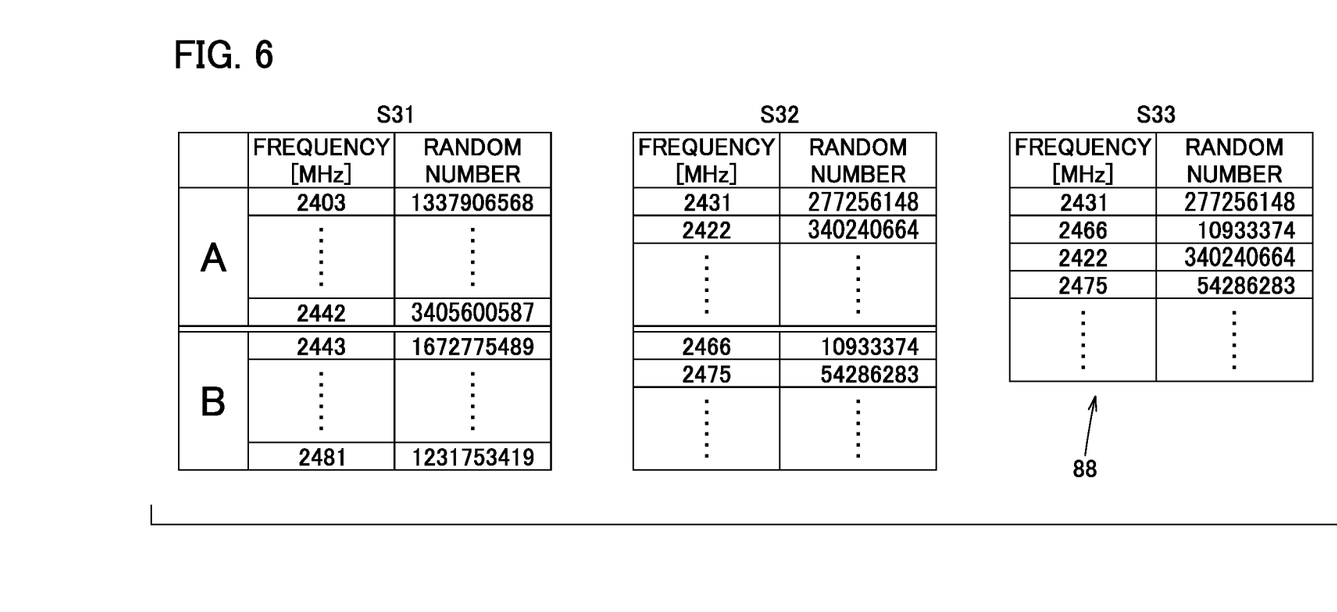
FIG. 6 is a diagram illustrating a frequency sorting process in a second embodiment.

A change pattern generating process according to a second embodiment will be described with reference to FIGS. 3, 4, and 6. Similarly to the first embodiment, in the second embodiment, the change pattern generating process illustrated in FIG. 3 is performed. In the second embodiment, the random number generating process illustrated in FIG. 4 is performed. In the second embodiment, the frequency sorting process illustrated in FIG. 6 is performed. In the processes of the second embodiment, description of the process same as in the first embodiment will be omitted.

FIG. 6 is a diagram illustrating a frequency sorting process in the second embodiment. The frequency sorting process illustrated in FIG. 6 is performed by the associating unit 46 and the pattern generating unit 48. The frequency sorting process illustrated in FIG. 6 is also performed by the associating unit 66 and the pattern generating unit 68.

In step S2 of FIG. 3, the associating unit 46 and the pattern generating unit 48 generate the change pattern 88 by executing the following algorithm. A process S31 to S33 shown in FIG. 6 correspond to a process of step S31 to step S33 described below.

In step S31, the associating unit 46 divides frequencies included in the band of 2403 to 2481 [MHz] into two groups. Group A includes frequencies of 2403 to 2442 [MHz]. Group B includes frequencies of 2443 to 2481 [MHz]. The associating unit 46 equalizes the number of frequencies included in each group. When the number of frequencies is not equal, the number of frequencies of the group A is increased.

Furthermore, the associating unit 46 associates each of different random numbers generated by the random number generating unit 64 with the frequency of each of the 79 channels. Decimal numbers corresponding to random numbers generated using "12224001" shown in FIG. 4 as the seed 70 are associated with the respective frequencies shown in FIG. 6. Specifically, a decimal number of a random number generated by performing the random number generating process 10+N times, is associated with the frequency of 2403+N (N is a natural number of 0 to 78) [MHz].

In step S32, the pattern generating unit 48 determines the order of the plurality of random numbers in each of the two groups, based on the numerical values represented by the respective random numbers. The pattern generating unit 48 regards a random number that is a string of n numbers as an n-digit numerical value. The pattern generating unit 48 determines the order of the respective random numbers when numerical values represented by the random numbers are arranged in ascending order in each of the two groups. The pattern generating unit 48 may determine the order of the respective random numbers when numerical values represented by the random numbers are arranged in descending order.

In step S33, the pattern generating unit 48 performs the process of selecting random numbers one by one alternately from the two groups in the same order as the random numbers. Specifically, the pattern generating unit 48 alternately repeats the process of selecting the smallest random number from the group A and the process of selecting the smallest random number from the group B. Instead, the pattern generating unit 48 may alternately repeat the process of selecting the largest random number from the group A and the process of selecting the largest random number from the group B. The pattern generating unit 48 arranges the random numbers in order of the selection. Further, the pattern generating unit 48 arranges the frequencies corresponding to the random numbers in the same order as the random numbers. The pattern generating unit 48 sets the frequency arrangement as the change pattern 88.

In the first embodiment and the second embodiment, the pattern generating units 48 and 68 each generate the change pattern 88 based on random numbers while using the PID of the base wireless device 18 as the seed 70. The PID is a unique number assigned to each base wireless device 18. That is, the pattern generating units 48 and 68 can each generate random numbers unique to each base wireless device 18. Therefore, even if the number of communication networks 14 increases, each communication network 14 can carry out bidirectional communication using its own change pattern 88. Therefore, there is a low possibility that radio waves of a plurality of communication networks 14 collide with each other.

The pattern generating device 24 may generate the change pattern 88 using frequencies of radio waves that are not used in an area where the wireless communication system 10 is provided. In this case, a frequency measurement device (not shown) may measure the frequencies of radio waves in the area where the wireless communication system 10 is provided, and provide the measurement result to the pattern generating device 24.

[5 Wireless Communication Carried Out by Base Wireless Device 18 and Remote Wireless Devices 20]

The base wireless device 18 and the remote wireless devices 20 initially share the same change pattern 88. For example, when the base wireless device 18 and each of the remote wireless devices 20 are paired, the base wireless device 18 transmits the PID to the remote wireless devices 20. Thus, the base wireless device 18 and the remote wireless devices 20 can each perform the random number generating process using the same PID as the seed 70. As a result, the base wireless device 18 and the remote wireless devices 20 can each generate the same change pattern 88. The base wireless device 18 may generate the change pattern 88 and transmit the change pattern 88 to the remote wireless devices 20 at the time of pairing. Alternatively, the pattern generating device 24 that is independent of the base wireless device 18 and the remote wireless devices 20 may generate the change pattern 88 and transmit the change pattern 88 to the base wireless device 18.

The base wireless device 18 and the remote wireless devices 20 perform a synchronization process before carrying out bidirectional communication. As the synchronization process, the base wireless device 18 performs a process of transmitting a synchronization signal to the plurality of remote wireless devices 20 over a broadcast system. The synchronization signal includes information (time data and the like) that is necessary for synchronization between the base wireless device 18 and the remote wireless devices 20. As described above, the frequency of the radio wave used when the synchronization signal is transmitted is referred to as the synchronous frequency.

The base frequency change unit 38 and the remote frequency change units 58 change the synchronous frequency based on the change pattern 88 generated in the first embodiment. The base frequency change unit 38 switches the synchronous frequency every first time interval T1. The remote frequency change units 58 each switch the synchronous frequency every second time interval T2. The base transmission/reception processing unit 40 performs a process for transmitting the synchronization signals through radio waves at synchronous frequencies. On the other hand, the remote transmission/reception processing units 60 each perform a process for receiving the radio waves at the synchronous frequencies. At the timing when the synchronous frequency of the base wireless device 18 matches the synchronous frequency of the remote wireless device 20, the remote wireless device 20 can receive the synchronization signal transmitted by the base wireless device 18.

After the synchronization process, the base frequency change unit 38 and the remote frequency change unit 58 change the carrier frequency based on the change pattern 88 generated in the second embodiment. The base frequency change unit 38 and the remote frequency change unit 58 switch the carrier frequency every time interval T3 that is common to both units. The base transmission/reception processing unit 40 performs a process of transmitting and receiving a radio wave at the carrier frequency. Similarly, the remote transmission/reception processing unit 60 performs a process of transmitting and receiving the radio wave at the carrier frequency. In this manner, the base wireless device 18 and the remote wireless device 20 carry out bidirectional communication by the frequency hopping method.

In the second embodiment, the associating unit 46 divides a predetermined frequency band (ISM band) into two groups with an intermediate frequency as a boundary. Further, the pattern generating unit 48 selects frequencies alternately from the two groups to generate the change pattern 88. According to this embodiment, when the base wireless device 18 and the remote wireless devices 20 carry out bidirectional communication, collision of radio waves with a change pattern 88 used by another network is less likely to occur.

[6 Technical Concepts Obtained from the Embodiments]

A description will be given below concerning the technical concepts that can be grasped from the above-described embodiments.

According to a first aspect of the present invention, the pattern generating device 24 generates the change pattern 88 of a frequency used in the wireless communication system 10 in which the base wireless device 18 and the at least one remote wireless device 20 communicate with each other while changing the frequency. The pattern generating device includes the random number generating unit 44 (64) configured to generate a plurality of random numbers using a unique number assigned to the base wireless device 18 as the seed 70, the associating unit 46 (66) configured to associate each of the different random numbers with the frequency of each channel, and the pattern generating unit 48 (68) configured to generate the change pattern 88 by determining order of the plurality of random numbers based on numerical values represented by the respective random numbers, and by arranging the frequencies corresponding to the random numbers in same order as the order of the random numbers.

In the first aspect of the present invention, the associating unit 46 (66) may be configured to divide the plurality of random numbers and the plurality of frequencies into a plurality of groups, and the pattern generating unit 48 (68) may be configured to determine order of the plurality of random numbers in each of the groups based on the numerical values represented by the respective random numbers, select a predetermined nth random number in the determined order, from each of the groups, and determine order of the plurality of random numbers that have been selected, based on the numerical values represented by the selected random numbers, and generate the change pattern 88 by arranging the frequencies corresponding to the random numbers in same order as the order of the random numbers.

In the first aspect of the present invention, the associating unit 46 (66) may be configured to divide the plurality of random numbers and the plurality of frequencies into two groups, and the pattern generating unit 48 (68) may be configured to determine order of the plurality of random numbers in each of the two groups based on the numerical values represented by the respective random numbers, and perform a process of selecting the random numbers one by one alternately from the two groups in same order as the order of the random numbers, and generate the change pattern 88 by arranging the random numbers in order of selection.

According to a second aspect of the present invention, the pattern generating method for generating the change pattern 88 of a frequency used in the wireless communication system 10 in which the base wireless device 18 and the at least one remote wireless device 20 communicate with each other while changing the frequency, is provided. The pattern generating method includes a random number generating step of generating a plurality of random numbers using a unique number assigned to the base wireless device 18 as the seed 70, an associating step of associating each of the different random numbers with the frequency of each channel, and a pattern generating step of generating the change pattern 88 by determining order of the plurality of random numbers based on numerical values represented by the respective random numbers, and by arranging the frequencies corresponding to the random numbers in same order as the order of the random numbers.

According to a third aspect of the present invention, the wireless communication system 10 in which the base wireless device 18 and the at least one remote wireless device 20 communicate with each other while changing a frequency, is provided. The wireless communication system 10 includes the random number generating unit 44 (64) configured to generate a plurality of random numbers using a unique number assigned to the base wireless device 18 as the seed 70, the associating unit 46 (66) configured to associate each of the different random numbers with the frequency of each channel, and the pattern generating unit 48 (68) configured to generate the change pattern 88 of the frequency by determining order of the plurality of random numbers based on numerical values represented by the respective random numbers, and by arranging the frequencies corresponding to the random numbers in same order as the order of the random numbers, the base frequency change unit 38 configured to change the frequency of a radio wave used in communication from the base wireless device 18 to the remote wireless device 20 based on the change pattern, and the remote frequency change unit 58 configured to change the frequency of a radio wave used in communication from the remote wireless device 20 to the base wireless device 18 based on the change pattern 88.

The present invention is not particularly limited to the embodiments described above, and various modifications are possible without departing from the essence and gist of the present invention.

What is claimed is:

1. A pattern generating device that generates a change pattern of a frequency used in a wireless communication system in which a base wireless device and at least one remote wireless device communicate with each other while changing the frequency, the pattern generating device comprising:
a random number generating unit configured to generate a plurality of random numbers using a unique number assigned to the base wireless device as a seed;
an associating unit configured to associate each of the different random numbers with the frequency of each channel; and
a pattern generating unit configured to generate the change pattern by determining order of the plurality of random numbers based on numerical values represented by the respective random numbers, and by arranging the frequencies corresponding to the random numbers in same order as the order of the random numbers.

2. The pattern generating device according to claim 1, wherein the associating unit is configured to divide the plurality of random numbers and the plurality of frequencies into a plurality of groups; and
the pattern generating unit is configured to:
determine order of the plurality of random numbers in each of the groups based on the numerical values represented by the respective random numbers;
select a predetermined nth random number in the determined order, from each of the groups; and
determine order of the plurality of random numbers that have been selected, based on the numerical values represented by the selected random numbers, and generate the change pattern by arranging the frequencies corresponding to the random numbers in same order as the order of the random numbers.

3. The pattern generating device according to claim 1, wherein the associating unit is configured to divide the plurality of random numbers and the plurality of frequencies into two groups; and
the pattern generating unit is configured to:
determine order of the plurality of random numbers in each of the two groups based on the numerical values represented by the respective random numbers; and
perform a process of selecting the random numbers one by one alternately from the two groups in same order as the order of the random numbers, and generate the change pattern by arranging the random numbers in order of selection.

4. A pattern generating method for generating a change pattern of a frequency used in a wireless communication system in which a base wireless device and at least one remote wireless device communicate with each other while changing the frequency, the pattern generating method comprising:
a random number generating step of generating a plurality of random numbers using a unique number assigned to the base wireless device as a seed;
an associating step of associating each of the different random numbers with the frequency of each channel; and
a pattern generating step of generating the change pattern by determining order of the plurality of random numbers based on numerical values represented by the respective random numbers, and by arranging the frequencies corresponding to the random numbers in same order as the order of the random numbers.

5. A wireless communication system in which a base wireless device and at least one remote wireless device communicate with each other while changing a frequency, comprising:
a random number generating unit configured to generate a plurality of random numbers using a unique number assigned to the base wireless device as a seed;
an associating unit configured to associate each of the different random numbers with the frequency of each channel; and a pattern generating unit configured to generate a change pattern of the frequency by determining order of the plurality of random numbers based on numerical values represented by the respective random numbers, and by arranging the frequencies corresponding to the random numbers in same order as the order of the random numbers;
a base frequency change unit configured to change the frequency of a radio wave used in communication from the base wireless device to the remote wireless device based on the change pattern; and
a remote frequency change unit configured to change the frequency of a radio wave used in communication from the remote wireless device to the base wireless device based on the change pattern.

* * * * *